United States Patent [19]

Willkop et al.

[11] Patent Number: 4,875,828
[45] Date of Patent: Oct. 24, 1989

[54] TURBO-ENGINE HAVING MEANS FOR CONTROLLING THE RADIAL GAP

[75] Inventors: Franz Willkop, Munich; Gerhard Zahring, Worthsee; Robert Rutsch, Karlsfeld; Joachim Popp, Dachau; Eberhard John, Munich, all of Fed. Rep. of Germany

[73] Assignee: MTU Motoren-und Turbinen-Union Munchen GmbH, Munich, Fed. Rep. of Germany

[21] Appl. No.: 281,531

[22] Filed: Jan. 23, 1989

Related U.S. Application Data

[63] Continuation of Ser. No. 936,584, Dec. 22, 1986, abandoned.

[30] Foreign Application Priority Data

Mar. 14, 1985 [DE]  Fed. Rep. of Germany ....... 3509192

[51] Int. Cl.⁴ .............................................. F01D 5/08
[52] U.S. Cl. ................................. 415/173.4; 415/177; 415/209.3
[58] Field of Search ...................... 415/177, 178, 199.5, 415/108, 209.3, 214.1, 220, 173.4, 173.1

[56] References Cited

U.S. PATENT DOCUMENTS

| 3,304,054 | 2/1967 | Oechslin et al. | 415/177 |
| 4,101,242 | 7/1978 | Coplin et al. | 415/199.5 |
| 4,334,822 | 6/1982 | Rossmann | 415/173.4 |
| 4,522,559 | 6/1985 | Burge et al. | 415/177 |
| 4,578,942 | 4/1986 | Weiler | 415/170.1 |
| 4,642,027 | 2/1987 | Popp | 415/177 |
| 4,669,955 | 6/1987 | Pellow | 415/173.4 |

FOREIGN PATENT DOCUMENTS

| 3018621 | 12/1981 | Fed. Rep. of Germany . | |
| 3308140 | 9/1984 | Fed. Rep. of Germany . | |
| 3333436 | 2/1985 | Fed. Rep. of Germany . | |
| 932045 | 3/1948 | France | 415/172 A |
| 628102 | 8/1949 | United Kingdom | 415/177 |
| 960812 | 6/1964 | United Kingdom . | |

Primary Examiner—Robert E. Garrett
Assistant Examiner—John T. Kwon
Attorney, Agent, or Firm—Roberts, Spiecens & Cohen

[57] ABSTRACT

A turbo-engine having a structure for controlling the radial gap and including an inner casing which surrounds a rotor and is assembled from shell-like parts; parts of this casing have a high thermal mass, are arranged around the rotor blades of the rotor and can be fastened in longitudinal direction (axial direction) to other parts.

8 Claims, 2 Drawing Sheets

TURBO-ENGINE HAVING MEANS FOR CONTROLLING THE RADIAL GAP

This is a continuation on application Ser. No. 936,584, filed Dec. 22, 1986, now abandoned.

BACKGROUND

In the casings of turbo-engines and particularly multi-stage turbo-engines, the adapting of the thermal behavior with the passage of time to that of the rotor so as to maintain the radial gap over rotor blades and stator vanes constant upon a change in load is always a problem. It is known that, in particular, the gap around the rotor blades has a great effect on efficiency, compressor stall and fuel consumption. A decrease in the consumption of fuel for the same power and outside dimensions of the power plant is desired.

In the design of this casing the following criteria, among others, are to be taken into account, in addition to the above-mentioned behavior:
 a) low weight
 b) simple manufacture: large tolerances in the case of inaccessibility/small tolerances in the case of accessibility
 c) narrow receiving grooves for the feet of the stator-vanes
 d) easy assembly
 e) easy disassembly
 f) rotor bladed and screwed with d) and e)
 g) provide grazing layers (narrow blade clearance)
 h) easy repair
 i) roundness of the casing during manufacture
 j) continued roundness of the casing in operation
 k) trueness to shape of the casing in axial direction during operation.

The designs known today are generally subdivided into horizontally (or vertically) divided casings (for instance, British Pat. No. 960 812 and Federal Republic of Germany Pat. No. 33 15 914) and casings consisting of rings (Federal Republic of Germany Pat. No. 30 18 621). A cup-shaped casing with suspended segments is another known possibility (for instance, Federal Republic of Germany Pat. No. 33 33 436).

Gap control is generally effected (if provided at all) by blowing against the casing (Federal Republic of Germany Unexamined Application OS 29 22 835), aeration of the rotor (Federal Republic of Germany Unexamined Application OS 33 08 140) or the application of weights (Federal Republic of Germany Application OS 29 07 748) in the casing above the rotor blades.

SUMMARY OF THE INVENTION

The object of the invention is to create a casing which takes the aforementioned criteria into account and makes it possible to obtain increased efficiency or power or a decrease in fuel consumption without making the overall size of the casing larger (particularly in diameter). Furthermore, the construction should be service-friendly.

This object is achieved by the features set forth in

The above object is achieved by a construction in which a plurality of axially spaced annular shell elements are provided to surround the rotor and a plurality of annular supports are juxtaposed in alternation between adjacent shell elements, each support carrying a run-in layer facing a respective row of rotor blades of the rotor. The shell elements each indluce opposite radial flanges and each of the supports includes a radial web which is engaged between the flanges of adjacent shell elements. A plurality of stators are disposed between respective adjacent supports, each stator including a stator vane and a foot, the foot of each stator hbeing held and supported between the adjacent supports while the radial webs are disposed between the radial flanges of adjacent shell elements. The supports and shell elements form a respective substantial mass outside and around each row of rotor blades to resist thermal deformation and maintain constant minimized gaps formed between each row of rotor blades and its respectivge run-in layer over the operating range of the engine. Annular coverings cover the shell elements and removal ports are provided for flow of fluid flowing in the engine between adjacent coverings and selected ones of the radial webs, the surfaces of the adjacent coverings and radial webs having heat barrier layers thereon.

Thermal behavior:
 Optimalized by arrangement of the flanges over the stator vanes and favorable ratio of radial flange height to length of rotor blade by screening elements and heat barrier layers.

Manufacture:
 Casing parts have centering seats which serve at the same time to receive the stator vane feet; the casing parts which are provided with a run-on layer are to be treated separately; the spray layers readily accessible on both sides; no deep, inaccessible notches for the reception of the stator vane feet required.

Assembly in the case of a complete rotor:
 In the event, for instance, that the parts 1, 14 and 9 have already been assembled, the stator vanes 15 are brought radially inward within the region 32 and pushed axially onto the layer support 9. An auxiliary ring 37 serves, during the axial placing thereover of the casing 3 for the radial fixing of the stator vanes 15. This procedure is used up to casing 13.

Disassembly in the case of a complete rotor:
 Is effected in the reverse sequence to assembly, the auxiliary ring 37 serving as support against travel of the stator vanes.

Grazing layers:
 Contained in a few rings (for instance blade 20 adjacent support 9) which can easily be removed.

Repair:
 Damage to vanes, see disassembly; Damage to layer, see grazing layers.

Roundness during manufacture:
 Relatively large radial flange height, mass of the layer supports, etc. assure greater roundness than with known constructions.

Roundness in operation:
 Due to diameter centering of the corresponding casing parts, substantially better than in the case of bolt centering; rigid, radially high flanges (without scallops) will not be transformed into polygonal shape upon change in load.

Trueness to shape in operation:
 Casing parts which are shaped uniformly and strongly in axial direction (principal axis) and held together by diameter centering scarcely tend to become deformed.

DETAILED DESCRIPTION OF A PREFERRED EMBODIMENT

Figure 1:
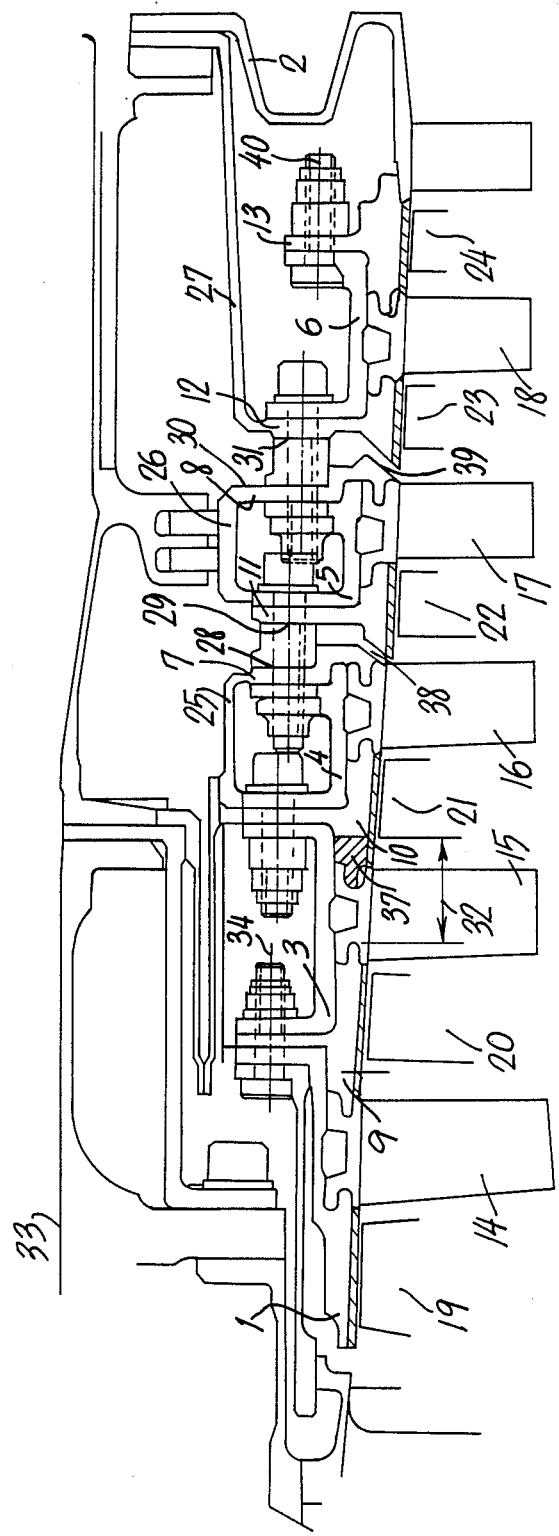
FIG. 1 is an axial sectional view of a turbo-engine casing according to the invention.

The drawing shows a new casing construction with stator vanes therein according to the invention. An inner casing line consists of end casings 1 and 2, connecting casings 3, 4, 5, and 6, in the form of annular shell elements blow-out casings 7 and 8 and layer supports 9, 10, 11, 12 and 13. The stator vanes are designated 14, 15, 16, 17 and 18 and the rotor blades by 19, 20, 21, 22, 23, and 24.

Furthermore, covers 25, 26, 27 and/or heat barrier layers 28, 29, 30 and 31 are applied in order to screen off or cover the casings 3–6 between the pairs of flanges thereof which determine the thermal behavior.

Known materials can be used for the components of the casing and other components of the turbo-engine. This applies also to the aforementioned vanes and layers. The technique for the manufacture of the components is also known.

A preferred use of the invention is for jet engines for airplanes.

As especially evident in the drawing, the supports 9–13 and the shell elements 3–6 form a substantial mass around each of the rotor blades 20–24 to resist thermal deformation and maintain the gap between the rotor blades and the inner casing. The radial flanges of the shell elements, for example, flanges 1a, 3a, in FIG. 2 and the webs of the supports 3–13, for example, webs 9a–11a in FIG. 2, can have a length up to about 85% of the length of the corresponding ortor blade to achieve said substantial mass. The flanges and webs are detachably connected together by bolts 40.

The layers on the supports 9–13 which face the tips of the rotor blades (see layer 9b in FIG. 2 by way of example) serve as run-in layers which, as known, can be worn down by the tips of the rotor blades without damage to the blades. The run-in layers of the invention can be made of zirconium dioxide which is sprayed on the supports 9–13.

An auxiliary ring 37 is formed with holding collars to engage in respective recesses in the associated support and foot of the stator vane to radially position the vane during assembly of the inner casing and to prevent travel of the stator vanes.

Figure 2:
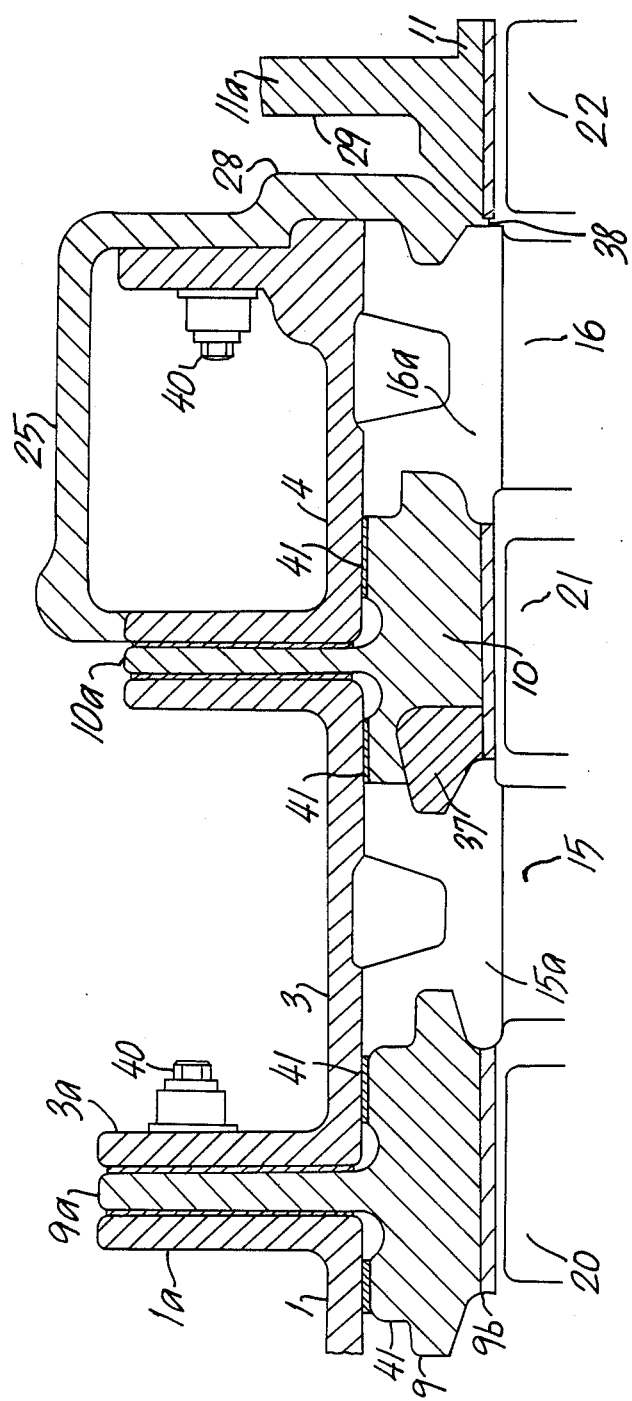
FIG. 2 is an enlarged view of a portion thereof.

As further evident in FIGS. 1 and 2, the construction provides for removal ports for air 38, 39 between respective pairs of casings 4, 5 and 5, 6. In FIG. 2 it particularly is seen that port 38 is found between cover 25 and web 11a and the port leads to a passage between the cover 25 and web 111 on which respective heat barrier layers 28, 29 are provided. This arrangement provides for effective aeration of the rotor.

The embodiments shown and described can be modified and individual features combined without thereby going beyond the scope of the invention.

What is claimed is:

1. A thermal turbo-engine comprising a rotor which rotates about an axis of rotation and includes a plurality of axially spaced rows of rotor blades, an outer casing, an inner casing connected to said outer casing and including a plurality of axially spaced annular shell elements surrounding the rotor, a plurality of annular supports juxtaposed in alternation between adjacent shell elements, each support carrying a run-in layer facing a respective row of rotor blades, means detachably connecting the shell elements and the supports to one another, said shell elements each including opposite radial flanges, said supports each including a radial web engaged between the flanges of adjacent shell elememts, a plurality of stators disposed between respective adjacent supports, each stator including a stator vane and a foot, the foot of each stator being held and supported between the adjacent supports with the respective radial web disposed between the radial flanges of adjacent shell elements, said radial web of each of said supports and the adjacent radial flanges of said shell elements forming a respective substantial mass which is aligned outside and around each row of rotor blades to resist thermal deformation and maintain constant minimized gaps formed between each row of rotor blades and its respective run-in layer over the operating range of the engine, fastening elements detachably connecting said shell elements and supports together and annular cover rings covering said shell elements to isolate the shell elements from fluid removed from fluid flowing in the engine, said inner casing defining removal ports for said fluid flowing in the engine, which ports lead to passages formed between respective cover rings and adjacent selected ones of said radial webs, and heat barrier layers on said cover rings and said ones of the radial webs which form said passages.

2. A thermal turbo-engine as claimed in claim 1 comprising means engaged with a respective support and foot of the stator vane for radially positioning the associated stator vane during assembly of the casing and to oppose travel of the stator vanes.

3. A thermal turbo-engine as claimed in claim 2 wherein said means for radially positioning the stator vane comprises an auxiliary ring with a holding collar.

4. A thermal turbo-engine as claimed in claim 3 wherein said auxiliary ring abuts against the respective support and said holding collar interlocks with said foot of the respective stator vane.

5. A thermal turbo-engine as claimed in claim 1 wherein each run-in layer comprises a stablized zirconium dioxide spray layer on the respective support.

6. A thermal turbo-engine as claimed in claim 1 wherein said radial flanges of said shell elements and said radial webs of said supports have a length up to about 85% of the length of a corresponding rotor blade.

7. A thermal turbo-engine as claimed in claim 1 wherein said shell elements are of U-shaped cross section, said opposite flanges of which extend radially and an axial annular web joins said radial flanges and surrounds said foot of a respective stator vane.

8. A thermal turbo-engine as claimed in claim 1 wherein the cover ring which bounds the passage for removal fluid is interposed between the radial web of the associated support and the radial flange of the associated shell element.

* * * * *